United States Patent [19]
Thorstensson

[11] Patent Number: 5,375,767
[45] Date of Patent: Dec. 27, 1994

[54] CUSHION SUSPENSION SYSTEM FOR AGRICULTURAL BOOM

[75] Inventor: Ulf S. Thorstensson, Davenport, Iowa

[73] Assignee: Hardi Inc, Davenport, Iowa

[21] Appl. No.: 117,889

[22] Filed: Sep. 7, 1993

[51] Int. Cl.⁵ .............................................. B05B 1/20
[52] U.S. Cl. .................................................... 239/164
[58] Field of Search ........................ 239/164, 165, 169; 280/711, 714

[56] References Cited

U.S. PATENT DOCUMENTS

| | | | |
|---|---|---|---|
| 2,912,234 | 11/1959 | Candlin | 280/711 X |
| 3,079,170 | 2/1963 | Alfieri | 280/711 X |
| 4,529,129 | 7/1985 | Ballu | 239/164 |

FOREIGN PATENT DOCUMENTS

| | | | |
|---|---|---|---|
| 2014834 | 9/1979 | United Kingdom | 239/164 |
| 2035233 | 6/1980 | United Kingdom | 239/164 |
| 2102661 | 2/1983 | United Kingdom | 239/164 |

Primary Examiner—Andres Kashnikow
Assistant Examiner—Kevin P. Weldon
Attorney, Agent, or Firm—Emrich & Dithmar

[57] ABSTRACT

A cushion suspension system for coupling an agricultural tool to a vehicle includes a flexible frame which permits vertical movement of the tool relative to the vehicle while maintaining the tool laterally fixed relative to the vehicle to prevent side-by-side oscillation. The flexible frame includes an air spring with an air filled bellows for providing vertical cushioning and a restoring force as the wheels of the vehicle encounter irregularities in the ground. Pressure within the air spring is adjustable to accommodate a range of agricultural tool sizes. The frame further includes a shock absorber for dampening vertical oscillation of the frame, with stops provided for limiting upward and downward displacement of the tool. The suspension system is particularly adapted for attaching an agricultural boom having a plurality of nozzles to a trailer-type sprayer.

11 Claims, 4 Drawing Sheets

CUSHION SUSPENSION SYSTEM FOR AGRICULTURAL BOOM

FIELD OF THE INVENTION

This invention relates generally to mechanisms for attaching a trailing tool to an agricultural vehicle and is particularly directed to a cushion suspension system for mounting a boom to an agricultural vehicle.

BACKGROUND OF THE INVENTION

Multi-section booms are frequently attached to an agricultural vehicle for performing various tasks. The boom may include a plurality of spaced nozzles for applying a herbicide or insecticide to crop rows. The boom sections may extend 70' or more in a direction transverse to the direction of movement of the agricultural vehicle. It is generally desirable to maintain the boom and attachments a fixed height above the crop rows. Because of the extended lengths and the requirement to minimize the weight of the boom assembly, there is a certain amount of "flex" in the boom. When the wheels of the vehicle traverse irregularities in the ground, the boom tends to oscillate in the vertical direction resulting in changes in the height of the tools above the crop row.

It is particularly desirable in the case of a sprayer to limit and dampen these oscillations and maintain the spray nozzles at a fixed height above the crop rows because each nozzle has a tapered spray pattern so that the area sprayed and the concentration of the chemical is constant only when the height of the nozzle is fixed. It is also desirable to maintain the lateral position of the tools relative to the crop rows fixed. This permits precise application of the herbicide or insecticide to the crop. Finally, it is desirable to provide a single suspension system for an agricultural boom which is capable of accommodating a wide range of boom lengths and weights and various attachments mounted to the boom.

SUMMARY OF THE INVENTION

Accordingly, this invention contemplates an air suspension system for coupling a boom to an agricultural vehicle. The boom suspension system includes a flexible frame having an inflated air spring which cushions the boom relative to an H-frame attached to the vehicle. As the frame flexes vertically, the air spring with an air filled bellows provides vertical cushioning and a restoring force as the wheels of the vehicle encounter irregularities in the ground. Pressure within the air spring may be adjusted to accommodate a range of boom sizes and weights. Also attached to the frame is a shock absorber for dampening oscillation of the frame. The frame is rigid in a lateral direction transverse to the direction of movement of the vehicle. Stops are provided for limiting upward and downward movement of the boom. The flexible frame of the air suspension system is of simplified design, comprised of identical forward and aft frame members and upper and lower pivot bars. The air suspension system is easily attached to a boom structure for coupling to an agricultural vehicle and is particularly adapted for mounting a sprayer boom to a sprayer tank vehicle. Moreover, the air suspension system of the present invention may be used to retrofit existing equipment to add a cushioning effect to the boom suspension system, thereby improving operation.

More specifically, this invention contemplates apparatus for attaching an agricultural boom to a vehicle in a suspended manner, the apparatus comprising: a first frame member fixedly coupled to the vehicle; a second frame member fixedly coupled to the boom; coupling means for pivotally coupling the first and second frame members, the coupling means including vertically moveable linkage for permitting relative vertical displacement between the first and second frame members while preventing lateral displacement between the first and second frame members; and air suspension means coupling the first and second frame members for cushioning relative vertical displacement between the first and second frame members and providing a restoring force between the first and second frame members following vertical displacement therebetween.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION

Figure 1:
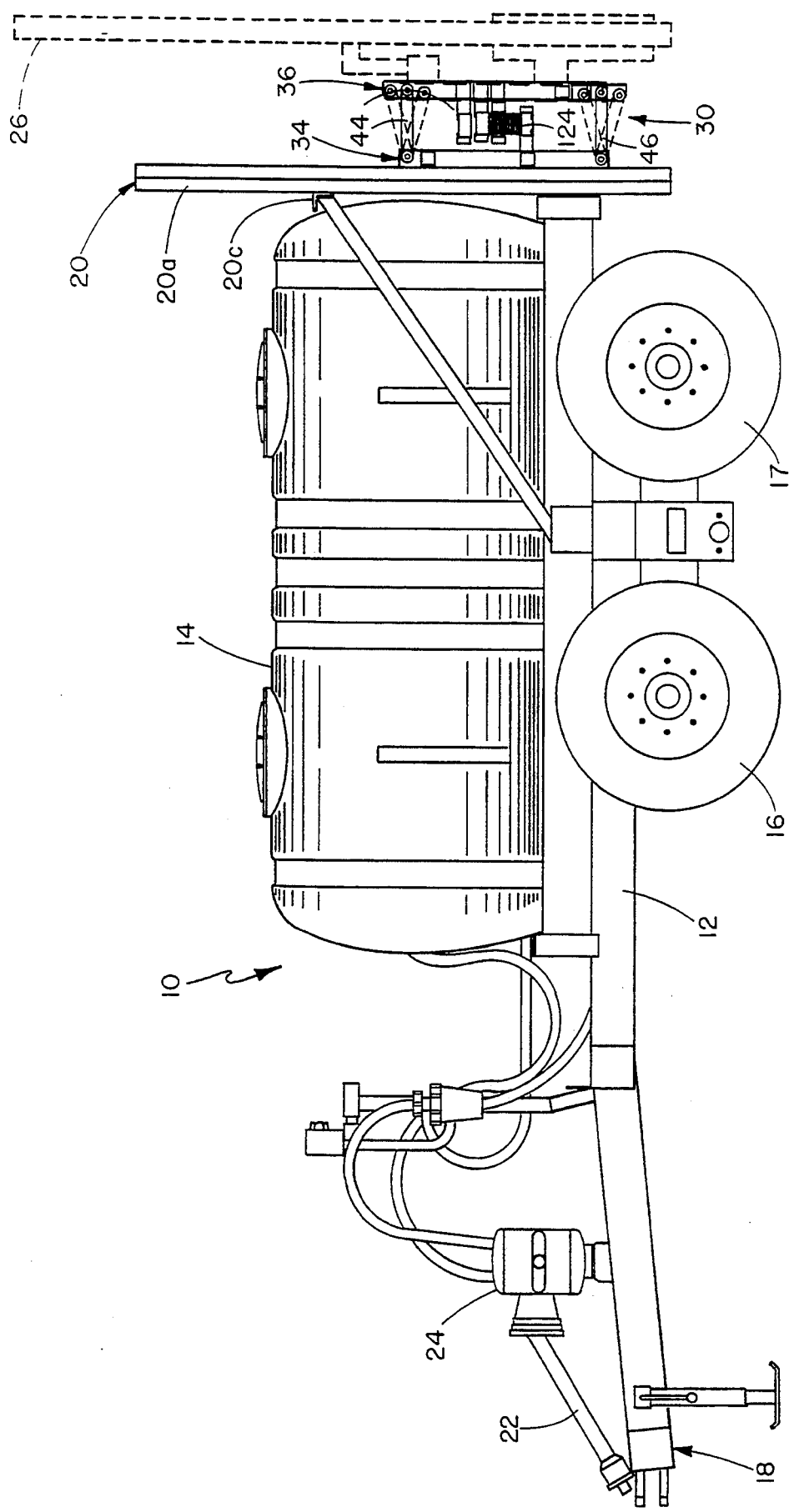
FIG. 1 is a side elevation view of an agricultural vehicle having a boom suspension system in accordance with the present invention attached to an aft portion thereof.

Referring to FIG. 1, there is shown a side elevation view of an agricultural vehicle 10 having a boom suspension system 30 in accordance with the present invention attached to an aft portion thereof. Agricultural vehicle 10 includes a support frame 12 upon which is mounted a storage tank 14. Storage tank 14 is adapted for storing and discharging a chemical solution such as a herbicide, insecticide or fungicide on row crops as the vehicle is pulled through a field. The agricultural vehicle 10 further includes a hitch mechanism with a draw bar 18 to facilitate pulling of the vehicle such as by a tractor (not shown). A power take-off (PTO) driven shaft 22 is adapted for coupling to the power take-off unit of the tractor and is connected to a pump 24.

Pump 24 is, in turn, connected to storage tank 14 for discharging the liquid therein such as by means of sprayer nozzles attached to a boom structure 26 (shown in dotted-line form) which is coupled to and supported by the inventive air suspension system 30.

Agricultural vehicle 10 further includes a plurality of support wheels, only two of which are shown in the figure as elements 16 and 17 for simplicity, for transport. Vehicle 10 typically includes other components to pump the liquid in the tank and force it through spray nozzles as the vehicle is pulled through a field. These components or attachments do not form a part of the present invention and are therefore not further described herein.

Figure 2:
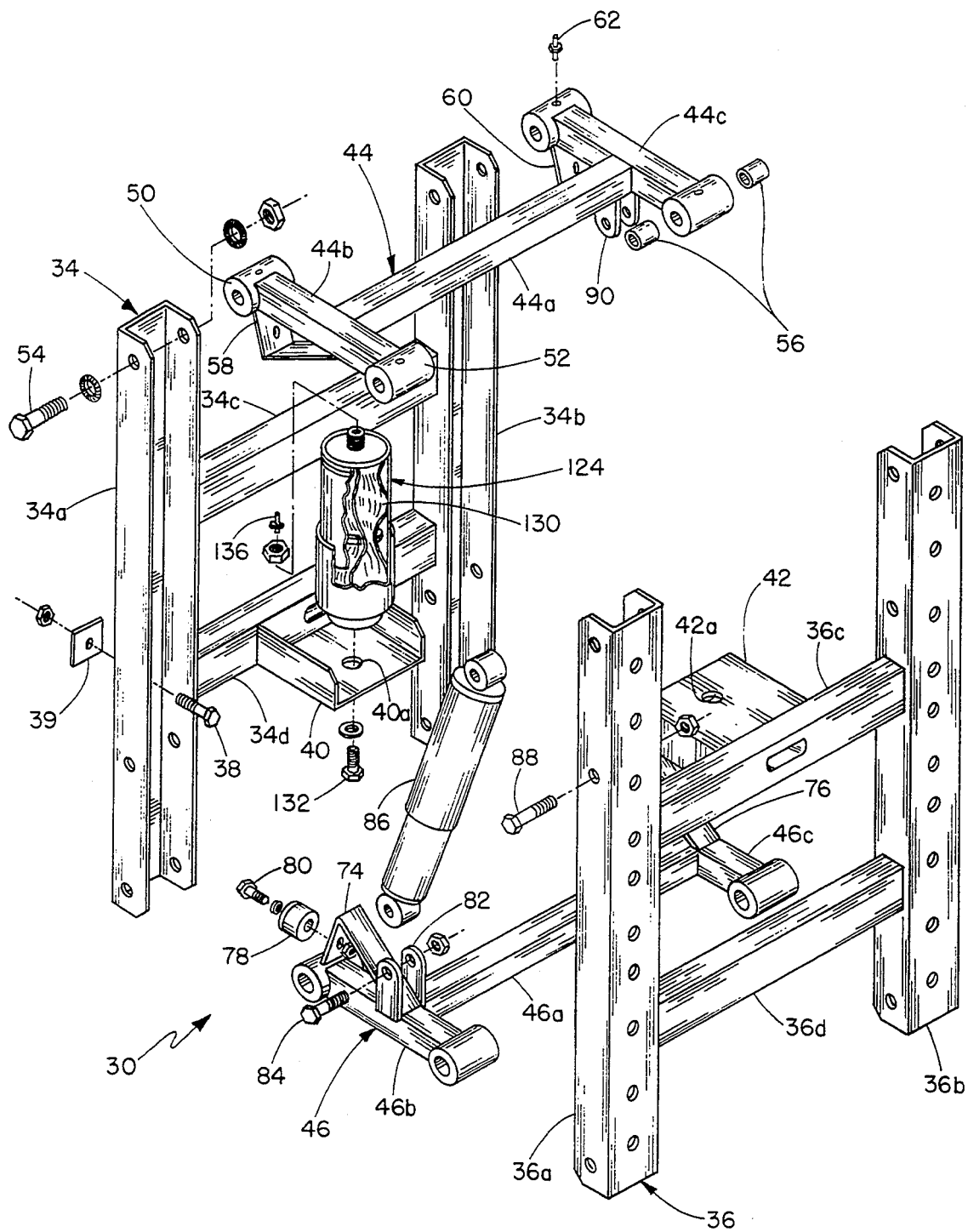
FIG. 2 is an exploded perspective view of the air suspension system of the present invention.

Referring to the boom suspension system 30 shown in FIG. 1 as well as to FIG. 2, which is an exploded perspective view of the inventive air suspension system, details of the operation and structure of the boom suspension system will now be described.

Figure 3:
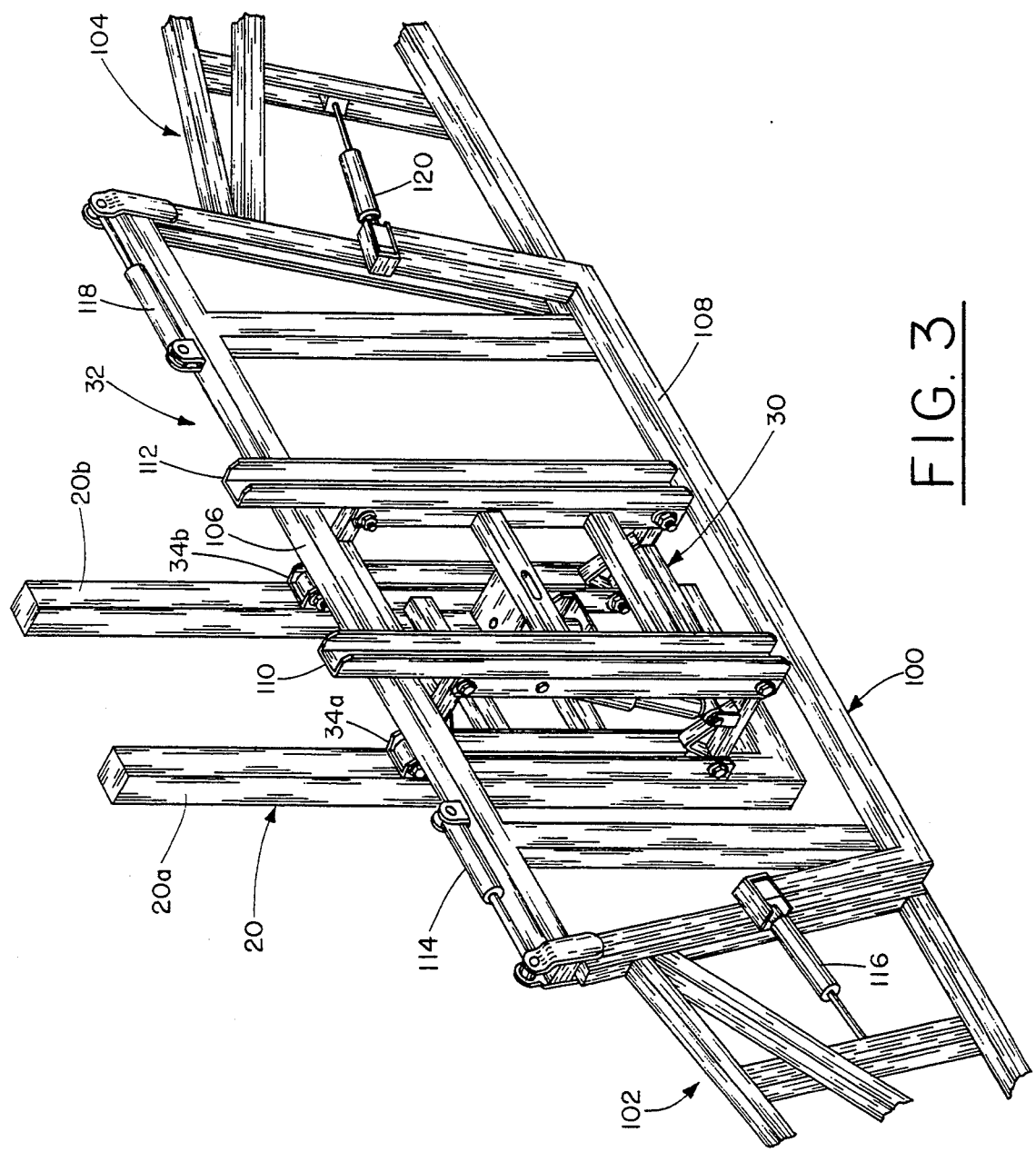
FIG. 3 is a partial perspective view showing the air suspension system of the present invention coupling a boom structure to the H-frame of an agricultural vehicle.
Figure 4:
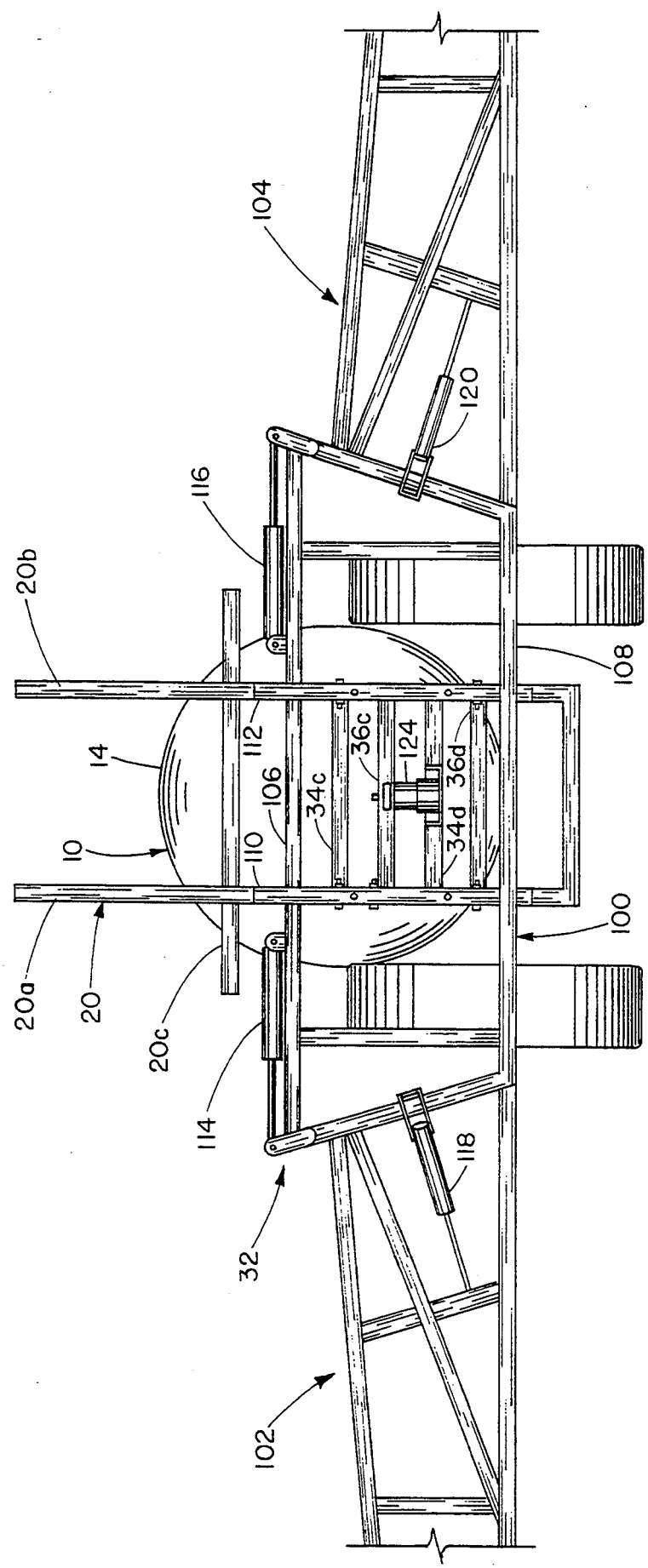
FIG. 4 is an aft elevation view of a boom structure coupled to an agricultural vehicle by means of the air suspension system of the present invention.

For simplicity, the illustration of FIG. 1 shows a boom diagrammatically which is manually operated. FIGS. 3-4, however, show an hydraulically-operated boom. The invention works equally well with either type of system. Moreover, persons skilled in this art are aware that the booms (whether manual or hydraulic) may be provided with an hydraulic system for adjusting the height of the boom relative to the frame mounted to the vehicle.

Although it is preferred that the present invention be provided with vertical adjustment, such adjusting systems are well known in the art and form no part of the present invention.

The air suspension system 30 includes generally rectangular forward and aft frames 34 and 36. Forward frame 34 is securely attached to an H-frame 20 mounted to an aft portion of agricultural vehicle 10. H-frame 20 includes a pair of spaced, generally vertical members, only one of which is shown in FIG. 1 as element 20a, and a horizontal cross member 20c coupling the two vertical members. Aft frame 36 is securely coupled to the boom structure 26 as described in detail below.

Forward frame 34 includes a pair of elongated, linear, spaced vertical members 34a and 34b each having a generally U-shaped transverse cross-section. Forward frame 34 further includes first and second linear, elongated cross members 34c and 34d securely connecting the first and second vertical members 34a and 34b. The first and second vertical members 34a, 34b and first and second cross members 34c, 34d form a generally rectangular, rigid structure adapted for secure coupling to the vehicle's H-frame 20 by means of a plurality of nut and bolt combinations 38. A spacer plate, or washer, 39 may be used with each nut and bolt combination 38 to ensure secure coupling between forward frame 34 and the vehicle's H-frame 20. Attached to the second cross member 34d is a lower mounting bracket 40 having an aperture 40a therein. Conventional means such as weldments may be used to attach the lower mounting bracket 40 to the second cross member 34d as well as to connect the aforementioned first and second vertical members 34a, 34b to the first and second cross members 34c, 34d in forming the forward frame 34.

Aft frame 36 is substantially of identical size and configuration as the previously described forward frame 34 and is interchangeable with the forward frame by turning it around and rotating it 180° about a horizontal axis. Thus, aft frame 36 includes a pair of spaced, vertical, elongated vertical members 36a and 36b, which, in combination with first and second cross members 36c and 36d, form the generally rectangular aft frame. An upper mounting bracket 42 having an aperture 42a therein is attached to the first cross member 36c of the aft frame 36. Conventional means such as nut and bolt combinations (not shown for simplicity) may be used to securely couple aft frame 36 to the manual boom structure 26. In addition, conventional means such as weldments may be used to connect the various components of the aft frame 36. While the forward and aft frames 34, 36 are of the same size and configuration, they are arranged in opposite vertical orientation in the suspension system 30.

The forward and aft frames 34, 36 are coupled by means of upper and lower pivot links 44 and 46. Upper pivot link 44 includes an elongated cross member 44a, to respective ends of which are mounted first and second pivot arms 44b and 44c. Disposed on respective ends of the first pivot arm 44b are first and second coupling members, or bearings, 50 and 52. A similar arrangement is disposed on opposed ends of the second pivot arm 44c of the upper pivot link 44. First coupling member 50 is adapted for pivoting connection to an upper portion of the forward frame's first vertical member 34a, while the corresponding coupling member of the second pivot arm 44c is adapted for pivoting connection to an upper portion of the second vertical member 34b. Similarly, the second coupling member 52 is adapted for pivoting connection to an upper portion of the aft frame's first vertical member 36a, while a corresponding coupling member on the second pivot arm 44c is adapted for pivoting connection to an upper portion of the second vertical member 36b. Conventional means such as nut and bolt combinations may be used to connect the upper pivot link 44 to aft frame 36, although these coupling means are not shown in the figures for simplicity. Respectively attached to the first and second pivot arms 44b, 44c are first and second stop brackets 58 and 60. A mounting bracket 90 is also attached to the second pivot arm 44c of the upper pivot link 44. Finally, bushings 56 are preferably used in connecting the upper pivot link 44 to the forward and aft frames 34, 36 and each coupling member on the ends of the upper pivot link 44 may be provided with a grease fitting 62.

As in the case of the upper pivot link 44, lower pivot link 46 includes an elongated, linear cross member 46a and first and second pivot arms 46b and 46c attached to respective ends of the cross member. Each of the pivot arms 46b, 46c is adapted for coupling to respective lower portions of the forward and aft frames 34 and 36 in a manner similar to the connections between the upper pivot link 44 and the forward and aft frames. In addition, first and second stop brackets 74 and 76 are respectively attached to the first and second pivot arms 46b, 46c of the lower pivot link 46. Mounting bracket 82 is also attached to the lower pivot link's first pivot arm 46b. Mounting bracket 82 is adapted for receiving and connection to one end of a shock absorber 86 by means of a nut and bolt combination 84. The other end of the shock absorber 86 is coupled to the aft frame's first vertical member 36a by conventional means such as a nut and bolt combination 88. The pivoting connections between the upper and lower pivot links 44, 46 and the forward and aft frames 34, 36 allow the air suspension system 30 to flex in a generally vertical direction as the agricultural vehicle's wheels encounter irregularities in the ground being traversed.

Flexure of the suspension system 30 accommodates vertical displacement of the boom structure attached to the suspension system 30 as ground irregularities are encountered. Shock absorber 86 dampens vertical oscillations between the forward and aft frames 34, 36 and reduces the tendency of the boom structure to move upward and downward with forward movement of the vehicle. The upper and lower pivot links 44, 46 are substantially identical in size and configuration and are interchangeable.

Connected to the forward frame's lower mounting bracket 40 and to the aft frame's upper mounting bracket 42 is an air spring 124. Air spring 124 is coupled to the forward frame's lower mounting bracket 40 by means of a bolt 132 inserted through the mounting bracket's aperture 40a. A similar coupling arrangement is provided for the upper end of the air spring 124 with the aft frame's upper mounting bracket 42. Air spring 124 includes a sealed bladder 130 which is filled with air by means of a control valve 136.

Bladder 130 may be inflated or deflated by means of control valve 136. The air spring may be of conventional design and operation, such as an airstroke actuator available from Firestone Industrial Products Company of Noblesville, Ind., used in a preferred embodiment. The pressure within air spring 124 may be adjusted to accommodate a range of boom sizes with greater air pressure provided for heavier boom and attachment combinations. Air spring 124 provides vertical cushioning between the boom and the vehicle, as well as a restoring force as the wheels of the vehicle encounter irregularities in the ground and the boom structure is vertically displaced. A compression coil spring could be substituted for air spring 124 with equally effective operation. However, the air spring has the desired advantage of permitting the same structure to be adjusted for booms of different weight.

As described above, upper pivot link 44 includes first and second stop brackets 58 and 60 and lower pivot link 46 similarly includes first and second stop brackets 74 and 76. As shown for the case of the first stop bracket 74 of the lower pivot link 46, each of the stop brackets is adapted to receive a respective stop grommet 78 which is attached to the bracket by means of a nut and bolt combination 80. A pair of such grommets 78 attached to the first and second stop brackets 74, 76 of the lower pivot link 46 limit upward displacement of the aft frame 36 relative to the forward frame 34 by respectively engaging the forward frame's first and second vertical members 34a and 34b. Similarly, a corresponding pair of grommets (not shown) attached to the first and second stop brackets 58 and 60 of the upper pivot link 44 engage respective upper portions of the forward frame's first and second vertical members 34a, 34b to limit downward displacement of the aft frame 36 relative to the forward frame. The lower pair of grommet and stop bracket combinations thus limit upward displacement of the boom attached to the aft frame 36, while the upper pair of grommet and stop bracket combinations limit downward displacement of the boom supported by the air suspension system 30. The upper and lower displacement limits of the boom may be varied by using stop grommets 78 having a range of thicknesses.

The upper and lower pivot links 44, 46 also function as torsion bars to transfer vertical forces between the right and left portions of the boom. For example, upward movement of one side of the aft frame 36 causes upward movement of those portions of the two pivot links attached thereto. The two pivot links undergo a twisting action resulting in upward movement of that portion of the opposed end of each pivot link attached to the other side of the aft frame 36. This twisting action of the two pivot links 44, 46 transfers vertical forces exerted on one end of the boom to the other end and tends to maintain the boom at the same height above the ground along its entire length.

Referring to FIG. 3, there is shown a partial perspective view of a conventional hydraulically actuated boom structure 32 attached to the H-frame 20 of an agricultural vehicle (not shown for simplicity) by means of the boom air suspension system 30 of the present invention. An aft elevation view of the boom structure 32 mounted to an agricultural vehicle 10 by means of the air suspension system 30 of the present invention is shown in FIG. 4. As shown in the figures, the forward frame's first and second vertical members 34a, 34b are respectively attached to first and second vertical members 20a, 20b of the H-frame 20. Similarly, the aft frame's vertical members 36a and 36b are respectively coupled to first and second upright members 110 and 112 of the boom structure's center frame 100.

In addition to center frame 100, the boom structure 32 includes first and second outer frames or boom wings 102 and 104 pivotally coupled to the center frame. First and second hydraulic cylinders 116 and 112 are connected between the wings and the center section for folding and unfolding the wings. Similarly, third and fourth hydraulic cylinders 114 and 118 are connected between the center section and the wings 102, 104 for tilting the wings, as desired by the operator. The four control cylinders 114, 116, 118 and 120 are powered by the tractor's hydraulic power take off and controlled at the operator's position. The first and second outer frames 102, 104 of the boom structure 32 are shown in the extended positions in FIGS. 3 and 4. Also as shown in FIG. 4, air spring 124 is generally vertically oriented and is coupled to the second cross member 34d of the forward frame 34 and to the first cross member 36c of the aft frame 36.

There has thus been shown an air suspension system for attaching an agricultural boom to a vehicle in a manner which permits limited vertical displacement of the boom as the vehicle travels through a field and encounters irregularities in the ground. The suspension system includes a flexible frame preferably having an inflatable air spring in the form of an inflatable bladder which provides vertical cushioning and a restoring force for the boom. The flexible frame is laterally rigid to prevent side-to-side movement of the boom and includes a shock absorber for dampening vertical oscillations of the boom. Pressure within the air spring is adjustable to accommodate a range of boom sizes, with the suspension system particularly adapted for attaching a boom having a plurality of sprayer attachments to a trailer-type sprayer.

While particular embodiments of the present invention have been shown and described, it will be obvious to those skilled in the art that changes and modifications may be made without departing from the invention in its broader aspects. For example, as discussed above, the suspension system may be provided with vertical adjustment and the boom may be manually or hydraulically operated. The boom and suspension system of the illustrated system are shown mounted on a trailer, but they could be mounted to the three-point mount of a tractor and the tanks carried by the tractor. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for attaching an agricultural tool including a boom to a vehicle in a suspended manner, said apparatus comprising:

a first frame member fixedly coupled to the vehicle;
a second frame member fixedly coupled to the boom;

coupling means including first and second pivot links for pivotally coupling said first and second frame members, said coupling means including vertically moveable linkage for permitting relative vertical displacement between said first and second frame members while preventing lateral displacement between said first and second frame members; and cushion suspension means coupling said first and second frame members for cushioning relative vertical displacement between said first and second frame members and providing a restoring force between said first and second frame members following vertical displacement therebetween, said cushion suspension means including an inflatable bladder having a valve for introducing air into or allowing escape of air from said bladder to permit said apparatus to accommodate a range of boom weights.

2. The apparatus of claim 1 wherein said first and second frame members are identical in size and shape and are interchangeable.

3. The apparatus 2 wherein said first and second pivot links are identical in size and shape and are interchangeable.

4. The apparatus of claim 1 wherein said first and second pivot links each include respective elongated, linear cross members aligned generally transverse to the direction of travel of the vehicle.

5. The apparatus of claim 4 wherein said first and second pivot links are arranged in a spaced, vertically aligned manner in said coupling means.

6. The apparatus of claim 1 wherein said first and second pivot links respectively include lower and upper stop means for limiting lower and upper displacement of the boom.

7. The apparatus of claim 6 wherein said lower and upper stop means each include a bracket coupled to a respective pivot link and a grommet coupled to said bracket for engaging a frame member when the boom reaches a lower or an upper limit.

8. The apparatus of claim 1 further comprising damping means connecting said coupling means to a frame member for limiting oscillations between said first and second frames.

9. The apparatus of claim 8 wherein said damping means includes a shock absorber.

10. The apparatus of claim 9 wherein said shock absorber is coupled between a pivot link and a frame member.

11. For use with an agricultural vehicle having an elongated boom extending generally transverse to a direction of travel of said vehicle, wherein said boom includes agricultural tools attached thereto, apparatus for attaching said boom to said vehicle and maintaining said boom generally horizontal and a fixed height above the ground, said apparatus comprising:

first and second pairs of coupling members, wherein said first pair of coupling members are attached in a spaced manner to the vehicle and said second pair of coupling members are attached in a spaced manner to the boom;

first and second frame members fixedly coupled said first and second pairs of coupling members, respectively;

coupling means for pivotally coupling said first and second frame members, said coupling means including vertically moveable torsion linkage for permitting relative vertical displacement between said first and second frame members and for transferring a vertical force exerted on a first end portion of the boom disposed on a first side of said coupling means to a second end portion of the boom disposed on a second opposed side of said coupling means for maintaining said first and second end portions of the boom at substantially the same height above the ground; and air suspension means coupling said first and second frame members for cushioning relative vertical displacement between said first and second frame members and providing a restoring force between said first and second frame members following vertical displacement therebetween, said air suspension means including an inflatable bladder having a valve for introducing air into or allowing escape of air from said bladder to permit said apparatus to accommodate a range of boom weights.

* * * * *